United States Patent [19]

Davis et al.

[11] 4,020,142

[45] Apr. 26, 1977

[54] CHEMICAL MODIFICATION OF POLYBENZIMIDAZOLE SEMIPERMEABLE

[75] Inventors: Howard J. Davis; Norman W. Thomas, both of Warren, N.J.

[73] Assignee: Celanese Corporation, New York, N.Y.

[22] Filed: Aug. 21, 1975

[21] Appl. No.: 606,617

[52] U.S. Cl. .......................... 264/347; 210/500 M; 260/31.2 N; 260/78 TF; 260/78.41; 264/41; 264/184; 264/331

[51] Int. Cl.$^2$ ................. C08G 73/18; B01D 39/00

[58] Field of Search ............. 264/340, 184, 41, 48, 264/347, 236, 232, 234, 331; 260/31.2 N, 78.4 R, 78.4 D, 874, 78.41, 78 TF, 47 CP; 210/500 M; 427/400; 428/410

[56] References Cited

UNITED STATES PATENTS

| | | | |
|---|---|---|---|
| 3,542,735 | 11/1970 | Lynch | 260/31.2 N |
| 3,720,607 | 3/1973 | Brinegar | 210/23 |
| 3,763,107 | 10/1973 | D'Alelio | 260/31.2 N |
| 3,808,305 | 4/1974 | Gregor | 210/500 M |
| 3,851,025 | 11/1974 | Ram | 264/184 |
| 3,892,665 | 7/1975 | Steigelmann et al. | 210/500 M |

*Primary Examiner*—Jeffery R. Thurlow

[57] ABSTRACT

A preformed polybenzimidazole semipermeable membrane (e.g., a film or hollow filament) is chemically modified in accordance with the present invention. Imidazole groups of the polybenzimidazole membrane are cross-linked by reaction with a strong polybasic acid or its acid chloride (as defined). During the reaction the polybasic acid is dissolved in a relatively mild acid medium (e.g., glacial acetic acid) which serves to decrease the basicity of the imidazole groups and to promote the desired cross-linking reaction. The resulting cross-linked membrane is tougher than the untreated membrane and may be more readily handled without deleterious results. Also, the resulting cross-linked polybenzimidazole membrane no longer is soluble in N,N-dimethylacetamide, and exhibits improved service characteristics such as improved compaction resistance during prolonged usage at high pressure. The product of the present invention is particularly suited for use in separations from acid waste streams. Cross-linked polybenzimidazole membranes capable of reverse osmosis separations, ion exchange separations, and ultrafiltration separations may be formed in accordance with the present process.

19 Claims, No Drawings

CHEMICAL MODIFICATION OF POLYBENZIMIDAZOLE SEMIPERMEABLE

BACKGROUND OF THE INVENTION

In recent years there has been increasing interest expressed in the development of microporous membranes of a semipermeable nature which are useful in separating the components of a solution. For instance semipermeable membranes have been looked to as a possible means to demineralize or purify otherwise unusable water and to thereby alleviate the increasing demands for potable water necessitated by the rapid growth of the population and industry in many parts of the world. Separation techniques which employ such membranes include electrodialysis, reverse osmosis, ultrafiltration, ion exchange, etc.

Electrodialysis separations employ an electrolytic cell having alternating anionic and cationic membranes that collect desalted and concentrated solutions in adjacent compartments. Such a technique can be useful to purify liquids by removing ionizable impurities, to concentrate solutions of electrolytes, or to separate electrolytes from non-electrolytes.

As opposed to the charge dependent types of separations, reverse osmosis utilizes pressure to move materials which may be either ionic or non-ionic selectively through a membrane. Ultrafiltration, which is very similar, uses gravity or applied pressure to effect separation using membranes which act as submicronic sieves to retain large molecules and permit the passage of small, ionic, or non-ionic forms.

The desalination of salt or sea water through the use of semipermeable membranes is commonly characterized by the use of pressure in excess of osmotic pressure and is therefore termed reverse osmosis. The natural tendency for a solution of a higher concentration separated from a solution of lower concentration by a semipermeable membrane, is for the solvent on the side of lower concentration to migrate through the membrane to the solution of higher concentration thereby eventually equilibrating the concentrations of the two solutions. The degree of this natural tendency is termed osmotic pressure. The process may be reversed by applying a force to the side of higher concentration in excess of the osmotic pressure to force the solvent of the solution of higher concentration through the semipermeable membrane to the side of lower concentration thereby bringing about a separation. The natural tendency which is believed to be the result of a difference in free energy resulting from the concentration gradient is observed to operate at a high thermodynamic efficiency, and at ambient temperature.

In the prior art semipermeable membranes have been formed from a variety of natural and synthetic materials including polybenzimidazoles. See, for instance, commonly assigned U.S. Pat. Nos. 3,699,038; 3,720,607; 3,737,042; 3,841,492; and 3,851,025. The polybenzimidazole membranes are recognized to possess superior thermal stability when compared with other semipermeable membranes, such as those formed from cellulose acetate.

It is an object of the present invention to provide a process for beneficially chemically modifying polybenzimidazole membranes.

It is an object of the present invention to provide a process wherein polybenzimidazole semipermeable membranes are chemically modified to render them more flexible and more amenable to bending and handling without deleterious results.

It is an object of the present invention to provide a process wherein polybenzimidazole semipermeable membranes are chemically modified to exhibit improved compaction resistance during high pressure separations which are carried out over an extended period of time.

It is an object of the present invention to provide improved chemically modified polybenzimidazole semipermeable membranes which are insoluble in N,N-dimethylacetamide.

It is an object of the present invention to provide improved chemically modified polybenzimidazole semipermeable membranes which particularly are suited for ultrafiltration separations.

It is an object of the present invention to provide improved chemically modified polybenzimidazole semipermeable membranes which particularly are suited for reverse osmosis separations, e.g., desalination.

It is another object of the present invention to provide improved chemically modified polybenzimidazole semipermeable membranes which are suited for combined reverse osmosis/ion exchange separations or combined ultrafiltration/ion exchange separations.

It is a further object of the present invention to provide improved chemically modified polybenzimidazole semipermeable membranes which particularly are suited for use in separations from acid waste streams.

These and other objects, as well as the scope, nature, and utilization of the claimed process will be apparent to those skilled in the art from the following description and appended claims.

SUMMARY OF THE INVENTION

It has been found that a process for beneficially chemically modifying a preformed polybenzimidazole semipermeable membrane comprises contacting the membrane with a strong polybasic acid having a $pK_A$ value below 4 or its acid halide which is dissolved in a relatively mild acid medium having a $pK_A$ value of about 4 to 5 to form a cross-linked polybenzimidazole wherein the polybasic acid or acid halide reacts with the imidazole groups of the polybenzimidazole membrane.

The chemically modified polybenzimidazole membrane is insoluble in N,N-dimethylacetamide, exhibits improved handling characteristics, and exhibits improved compaction resistance during service at high pressures.

DESCRIPTION OF PREFERRED EMBODIMENTS

THE STARTING MATERIAL

Polybenzimidazoles are a known class of heterocyclic polymers. Typical polymers of this class and their preparation are more fully described in U.S. Pat. No. 2,895,948, U.S. Pat. No. Re. 26,065, and in the Journal of Polymer Science, Vol. 50, pages 511–539 (1961) which are herein incorporated by reference. The polybenzimidazoles consist essentially of recurring units of the following Formulas I and II. Formula I is:

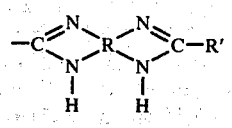

wherein R is a tetravelent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

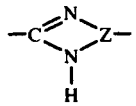

wherein Z is an aromatic nucleus having the nitrogen atoms forming the benzimidazole ring paired upon adjacent carbon atoms of the aromatic nucleus.

Preferably, aromatic polybenzimidazoles are selected, e.g., polymers consisting essentially of the recurring units of Formulas I and II wherein R' is at least one aromatic ring or a heterocyclic ring.

As set forth in U.S. Pat. No. Re. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxylic compound selected from the class consisting of (a) the diphenyl ester of an aromatic dicarboxylic acid, (b) the diphenyl ester of a heterocyclic dicarboxylic acid wherein the carboxyl groups are substituents upon a carbon in a ring compound selected from the class consisting of pyridine, pyrazine, furan, quinoline, thiophene and pyran and (c) an ahydride of an aromatic dicarboxylic acid.

Examples of polybenzimidazoles which have the recurring structure of Formula I are as follows:

poly-2,2'(m-phenylene)-5,5'-bibenzimidazole;
poly-2,2'-(pyridylene-3'',5''')-5,5'-bibenzimidazole;
poly-2,2'-(furylene-2'',5''')-5,5'-bibenzimidazole;
poly-2,2'-(naphthalene-1'',6'')-5,5'-bibenzimidazole;
poly-2,2'-(biphenylene-4'',4''')-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexeneyl-5,5'-bibenzimidazole;
poly-2,2'-(m-phenylene-5,5'-di(benzimidazole)ether;
poly-2,2'-(m-phenylene-5,5'-di(benzimidazole) sulfide;
poly-2,2'-(m-phenylene-5,5'-di(benzimidazole) sulfone;
poly-2,2'-(m-phenylene-5,5'-di(benzimidazole) methane;
poly-2',2'''-(m-phenylene-5',5''-di(benzimidazole) propane-2,2; and
poly-2', 2'''-(m-phenylene-5', 5''-di(benzimidazole) ethylene-1,2 where the double bonds of the ethylene groups are intact in the final polymer.

The preferred polybenzimidazole semipermeable membrane for use in the present process is one prepared from poly-2,2'-(m-phenylene)-5,5'-bibenzimidazole, the recurring unit of which is:

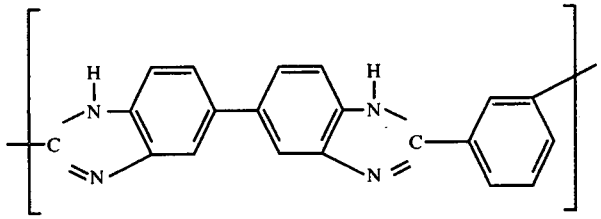

Any polymerization process known to those skilled in the art may be employed to prepare the polybenzimidazole which may then be formed into a semipermeable membrane. Representative techniques for preparing the polybenzimidazole are disclosed in U.S. Pat. Nos. 3,509,108; 3,549,603; and 3,551,389, which are assigned to the assignee of the present invention and are herein incorporated by reference.

With respect to aromatic polybenzimidazoles, preferably equimolar quantities of the monomeric tetraamine and dicarboxyl compound are introduced into a first stage melt polymerization reaction zone and heated therein at a temperature above about 200° C., preferably at least 250° C., and more preferably from about 270° to 300° C. The reaction is conducted in a substantially oxygen-free atmosphere, i.e., below about 20 ppm oxygen and preferably below about 8 ppm oxygen, until a foamed prepolymer is formed having an inherent viscosity, expressed as deciliters per gram, of at least 0.1 and preferably from about 0.13 to 0.3, the inherent viscosity (I.V.) as used herein being determined from a solution of 0.4 grams of the polymer in 100 ml. of 97 percent $H_2SO_4$ at 25° C.

After the conclusion of the first stage reaction, which normally takes at least 0.5 hour and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.6, e.g., 0.80 to 1.1 or more.

The temperature employed in the second stage is at least 250° C., preferably at least 325° C., and more preferably from about 350° to 425° C. The second stage reaction generally takes at least 0.5 hour, and preferably from about 1 to 4 hours or more.

A particularly preferred method for preparing the polybenzimidazole is disclosed in the aforesaid U.S. Pat. No. 3,509,108. As disclosed therein aromatic polybenzimidazoles may be prepared by initially reacting the monomer in a melt phase polymerization at a temperature above about 200° C. and a pressure above 50 psi (e.g. 300 to 600 psi) and then heating the resulting reaction product in a solid state polymerization at a temperature above about 300° C. (e.g., 350° to 500° C.) to yield the final product.

The polybenzimidazole semipermeable membranes which are chemically modified in accordance with the present process may be formed by any one of a variety of casting or extrusion techniques as will be apparent to those skilled in the art. Conventional membrane formation techniques may be utilized. The polybenzimidazole semipermeable membranes which serve as the starting material in the present process may assume the configuration of a film (e.g., a flat film) or the configuration of a hollow filament wherein the walls of the filament serve the role of a semipermeable membrane. Preferred techniques for forming the polybenzimidazole semipermeable membrane starting material are disclosed in U.S. Pat. Nos. 3,699,038; 3,720,607; 3,737,042; 3,841,492; and 3,851,025 which are herein incorporated by reference.

When the polybenzimidazole semipermeable membrane starting material is a film (e.g., a flat film) it commonly has a thickness of about 0.5 to 12 mils and preferably a thickness of about 1 to 5 mils.

When the polybenzimidazole semipermeable membrane starting material is a hollow filament, it commonly has an outer diameter of about 50 to 300 microns (preferably an outer diameter of about 80 to 200 microns), and an inner diameter of about 25 to 150 microns (preferably an inner diameter of about 40 to 70). Wall thickness for the hollow filaments commonly ranges from about 20 to 160 microns, and preferably from about 40 to 60 microns. A ratio of outer diameter to inner diameter of about 1.6 to 2.4:1 is preferred. The hollow filaments are capable of withstanding applied pressures up to 1,500 psi when such ratio is about 2.0:1 ± 0.2.

Prior to the chemical modification treatment of the present process the polybenzimidazole semipermeable membrane is non-cross-linked, and is soluble in solvents, such as N,N-dimethylacetamide.

THE CHEMICAL MODIFICATION

The preformed polybenzimidazole semipermeable membrane is chemically modified to form a cross-linked polybenzimidazole. The resulting chemically modified semipermeable membrane unlike the starting material is insoluble in solvents such as N,N-dimethylacetamide.

The desired chemical modification is accomplished by contacting the preformed membrane with a strong polybasic acid having a $pK_A$ value below 4 or its acid halide which is dissolved in a relatively mild acid. The strong polybasic acid may be organic or inorganic in nature. The $pK_A$ value of a given acid conveniently may be ascertained by determining the negative logarithm of the $K_A$ for the acid in a 0.1M aqueous solution at 25° C. The strong acids selected are polybasic in the sense that then they are organic acids they have two or more acid functional groups per molecule, and when they are inorganic acids they have the ability to transfer to a base more than one proton. As is known in the art such polybasic acids dissociate in more than one step. Accordingly, the $pK_A$ values expressed herein when applied to strong polybasic acids which dissociate in more than one step, refer individually to the $pK_A$ values for the first and second ionization steps. Commonly the strong polybasic acid selected exhibits a $pK_A$ (i.e., a $pK_1$ and a $pK_2$) of about 0.5 to 3.5, and preferably below 2.5. When a polybasic acid is selected which exhibits a $pK_A$ much above 4, then the desired cross-linking reaction is not achieved.

The strong polybasic acid which is utilized in the present process may be a carboxylic acid, a sulfonic acid, sulfuric acid or phosphoric acid. Also, polybasic sulfinic, phosphinic, and phosphonic acids may be selected. The strong polybasic organic acids may include functional groups other than the required plurality of acid groups, e.g., halogens which do not interfere with the desired cross-linking reaction. Acid halides of such strong polybasic acids, e.g., acid chlorides, likewise may be selected. Mixtures of strong polybasic acids and/or acid halides of the same may be utilized. When an acid chloride is utilized the polybenzimidazole tends to be covalently cross-linked, otherwise the cross-linking tends to be ionic in nature.

Representative strong polyfunctional carboxylic acids suitable for use in the present process are as follows:

perfluoroglutaric acid
benzene hexacarboxylic acid
benzene pentacarboxylic acid
1,2,3,4-benzenetetracarboxylic acid
1,2,3,5-benzenetetracarboxylic acid
1,2,4,5-benzenetetracarboxylic acid
1,3,5-benzenetricarboxylic acid
dibromosuccinic acid
polyacrylic acid
1,4,5,8-naphthalenetetracarboxylic acid Representative other strong polyfunctional organic acids suitable for use in the present process are as follows:

2,6-naphthalenedisulfonic acid
aryl-sulfonic acids
aryl-sulfinic acids
aryl-phosphinic acids
aryl-phosphonic acids Representative acid halides of acids suitable for use in the present process are as follows:

isophthaloyl chloride
terephthaloyl chloride
adipoyl chloride
m-benzenedisulfonyl chloride The relatively mild acid medium in which the strong polybasic acid is dissolved during the chemical modification reaction has a $pK_A$ value of about 4 to 5. The relatively mild acid medium is non-aqueous aqueous and serves to decrease the basicity of the imidazole groups of the membrane to make the reaction more selective in that only strong polybasic acids react to form cross-links. Representative relatively mild media include: glacial acetic acid, propionic acid, chloroacetic acid, formic acid, fluoroacetic acid, trimethylacetic acid, n-valeric acid, dimethylacetic acid, etc. The particularly preferred relatively mild acid medium is glacial acetic acid.

The concentration of the strong polyfunctional organic acid in the mild acid medium during the chemical modification reaction may be varied. Commonly, the strong polyfunctional acid is provided in the mild acid medium in a concentration of about 1 to 25 percent by weight based upon the total weight of the solution, and preferably in a concentration of about 1 to 10 percent by weight.

The desired cross-linking of the polybenzimidazole rapidly occurs upon contact with the solution of the strong polyfunctional organic acid. The progress of the chemical modification readily may be monitored by testing the solubility of a portion of the membrane in a common polybenzimidazole solvent, such as N,N-dimethylacetamide. Once the desired cross-linking is complete the membrane no longer is soluble in common polybenzimidazole solvents, such as N,N-dimethylacetamide. The temperature of the solution of the strong polybasic acid at the time of contact is not critical to the accomplishment of the desired chemical modification and commonly is about 5° to 100° C., and preferably about 20° to 30° C. Contact times of about 1 to 300 minutes commonly are sufficient to accomplish the chemical modification. In some instances contact times as brief as about 1 or 2 minutes are sufficient. Contact times longer than 300 minutes may be utilized without any commensurate advantage. Following the chemical modification the membrane commonly exhibits a weight increase of about 8 to 35 percent by weight based upon the weight of the membrane prior to the chemical modification.

If a strong polybasic acid such as 1,4,5,8-naphthalene tetracarboxylic acid is selected which is only slightly soluble at room temperature in glacial acetic acid, then a higher solubility of the polybasic acid can be obtained at a higher temperature, and the cross-linking reaction more readily may be carried out at an elevated temperature.

Following formation the resulting chemically modified polybenzimidazole membrane is stored and utilized while immersed in a liquid having a pH of 7 or below. At a pH above 7 the ionic cross-linking accomplished during the chemical modification is deleteriously influenced.

The polybenzimidazole membranes of the present invention are stronger, more flexible and tougher than the starting material. Such properties enable the membranes to be more readily rolled or otherwise handled without harm. Also, the product exhibits a lesser tendency to undergo shrinkage at elevated temperatures, and to resist compaction during extended use at high pressures. This resistance to compaction (i.e., membrane stabilization) enables the polybenzimidazole membranes to maintain high flux usage even after extended periods of time.

The chemically modified polybenzimidazole membranes of the present invention may be utilized in the various separations proposed for polybenzimidazole membranes in the prior art provided the proper pH is maintained. For instance, reverse osmosis desalination may be accomplished. The membranes of the present invention particularly are suited for use in separations from acid waste streams, e.g., to separate inorganic salts such as nickel sulfate from dilute sulfuric acid waste streams. If the initial polybenzimidazole semipermeable membrane has reverse osmosis properties, these properties are retained following the cross-linking reaction, as are ultrafiltration capabilities. If the strong polybasic acid contains three or more acid groups (e.g., polyacrylic acid, benzenehexacarboxylic acid, polysulfonic acids, etc.), then the excess acid groups which do not undergo reaction with the polybenzimidazole remain and serve as cation exchange sites. One may therefore form an improved polybenzimidazole ion exchange membrane having in addition reverse osmosis or ultrafiltration characteristics. For example, desalination and removal of metal cations, e.g., iron, chromium, lead, cadmium, mercury, lead, calcium, magnesium, etc. may be accomplished from waste streams at controlled pH conditions (preferably pH 3 to 3).

The following examples are given as specific illustrations of the invention. It should be understood, however, that the invention is not limited to the specific details set forth in the examples.

EXAMPLE I

A polybenzimidazole reverse osmosis membrane in the form of a flat film, namely poly-2,2'-(m-phenylene-5,5'-bibenzimidazole, is selected as the exemplary polybenzimidazole for use in carrying out the process of this invention. The semipermeable membrane which serves as the starting material has a thickness of 4 mils, and is formed by casting in an air atmosphere a film upon a glass plate from a solution consisting of 18 parts by weight polybenzimidazole and 2 parts by weight lithium chloride dissolved in 80 parts by weight N,N-dimethylacetamide. The clearance between the doctor blade and the glass plate is 8 mils and a casting speed of 14 inches per minute is utilized. Thirty seconds after casting the glass plate on which the film is supported is immersed in distilled water at 25° C., washed in distilled water, and stored therein. The membrane next is subjected to an annealing step by immersing for 10 minutes in a vessel containing ethylene glycol provided at 165° C. The resulting membrane readily separates from the glass plate and is soluble in N,N-dimethylacetamide.

The membrane is immersed in a 10 percent by weight solution of perfluoroglutaric acid dissolved in glacial acetic acid for 120 minutes while the solution is maintained at a temperature of 25° C. The membrane is suspended in the solution by means of stainless steel clips during the chemical modification. While immersed in the solution, the polybenzimidazole becomes ionically cross-linked with the perfluoroglutaric acid reacting with the imidazole groups of the membrane. The membrane experiences a 35 percent increase in weight based upon the dry weight of the membrane as a result of ionic cross-linking, and no longer is soluble in N,N-dimethylacetamide.

The resulting cross-linked membrane is more flexible, tougher, and stronger than the starting material. It also exhibits a resistance to compaction upon use at elevated pressures for extended periods of time as evidenced by the stability of its flux characteristics.

For comparative purposes Example I is repeated with the exception that perfluoroglutaric acid is omitted and the membrane is immersed solely in acetic acid. No cross-linking and no increase in membrane weight takes place. The membrane continues to be soluble in N,N-dimethylacetamide.

EXAMPLE II

Example I is repeated with the exception that isophthaloyl chloride is substituted for the perfluoroglutaric acid component of the solution which is contacted with the membrane.

Substantially similar results are achieved with the cross-linking being primarily covalent in nature and the increase in weight being about 8 percent.

EXAMPLE III

Example I is repeated with the exception that sulfuric acid is substituted for the perfluoroglutaric acid component of the solution which is contacted with the membrane and the membrane is immersed in the acid solution for 30 minutes instead of 120 minutes.

Substantially similar results are achieved with the cross-linking being primarily ionic in nature and the increase in weight being about 18 percent.

EXAMPLE IV

Example I is repeated with the exception that polyacrylic acid having an average molecular weight of about 2000 is substituted for the perfluoroglutaric acid component of the solution when contacted with the membrane, and the membrane is immersed in the acid solution for 30 minutes instead of 120 minutes.

Substantially similar results are achieved with the cross-linking being primarily ionic in nature and the increase in weight being about 20 percent.

EXAMPLE V

Example I is repeated with the exception that pyromellitic acid is substituted for the perfluoroglutaric acid component of the solution when contacted with the membrane and the membrane is immersed in the acid solution for 3 minutes instead of 120 minutes.

Substantially similar results are achieved with the cross-linking being primarily ionic in nature and the increase in weight being about 35 percent.

EXAMPLE VI

Example I is repeated with the exception that naphthalene-1,4,5,8-tetracarboxylic acid is substituted for the perfluoroglutaric component of the solution when contacted with the membrane and the membrane is immersed in the acid solution for 30 minutes instead of 120 minutes.

Substantially similar results are achieved with the cross-linking being primarily ionic in nature and the increase in length being about 20 percent.

For comparative purposes Example VI is repeated with the exception that the strong monobasic acid trichloroacetic acid is substituted for the naphthalene-1,4,5,8-tetracarboxylic acid. The trichloracetic acid does react with the polybenzimidazole to produce a membrane weight gain of about 20 percent. However, no cross-linking of the polybenzimidazole occurs and the membrane continues to be soluble in N,N-dimethylacetamide.

EXAMPLE VII

Example I is repeated with the exceptions indicated. The poly-2,2'-(m-phenylene)-5,5'-bibenzimidazole starting material is in the configuration of a hollow filament rather than that of a flat film. The hollow filament has an outer diameter of about 220 microns, an inner diameter of about 100 microns, and a wall thickness of about 60 microns, and was formed by extruding fibers via the dry jet wet spinning process of U.S. Pat. No. 3,851,025 through an annular jet from a 24 percent by weight solution of the polymer in N,N-dimethylacetamide which also contains 2 percent by weight lithium chloride.

The hollow filament membrane following treatment in ethylene glycol is immersed in the perfluoroglutaric acid solution as described in Example I.

Substantially similar results are achieved.

EXAMPLE VIII

Example VII is repeated with the exception that isophthaloyl chloride is substituted for the perfluoroglutaric acid component of the solution which is contacted with the hollow filament membrane.

Substantially similar results are achieved.

EXAMPLE IX

Example VII is repeated with the exception that sulfuric acid is substituted for the perfluoroglutaric acid component of the solution which is contacted with the hollow filament membrane.

Substantially similar results are achieved.

Although the invention has been described with preferred embodiments, it is to be understood that variations and modifications may be resorted to as will be apparent to those skilled in the art (e.g., the process could be carried out on a continuous basis, etc.). Such variations and modifications are to be considered within the purview and scope of the claims appended hereto.

We claim:

1. A process for chemically modifying a preformed polybenzimidazole semipermeable membrane wherein said polybenzimidazole is soluble in N,N-dimethylacetamide and consists essentially of recurring units of the formula:

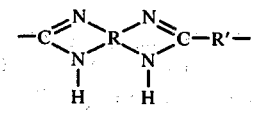

wherein R is a tetravelent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from 4 to 8 carbon atoms, and (3) a heterocyclic ring selected from the group consisting of (a) pyridine, (b) pyrazine, (c) furan, (d) quinoline, (e) thiophene, and (f) pyran, comprising contacting said membrane with a strong polybasic acid having a $pK_A$ value below 4 or its acid halide which is dissolved in a relatively mild acid medium having a $pK_A$ value of about 4 to 5 in a concentration sufficient to form a cross-linked polybenzimidazole which is not soluble in N,N-dimethylacetamide wherein said polybasic acid or acid halide reacts with the imidazole groups of said polybenzimidazole membrane.

2. A process for chemically modifying a preformed polybenzimidazole semipermeable membrane in accordance with claim 1 wherein said polybenzimidazole is poly-2,2'-(m-phenylene)-5,5'-bibenzimidazole.

3. A process for chemically modifying a preformed polybenzimidazole semipermeable membrane in accordance with claim 1 wherein said membrane has the configuration of a film.

4. A process for chemically modifying a preformed polybenzimidazole semipermeable membrane in accordance with claim 3 wherein said film has a thickness of about 0.5 to 12 mils.

5. A process for chemically modifying a preformed semipermeable polybenzimidazole membrane in accordance with claim 1 wherein said membrane has the configuration of a hollow filament.

6. A process for chemically modifying a preformed polybenzimidazole semipermeable membrane in accordance with claim 5 wherein said hollow filament has a wall thickness of about 20 to 160 microns.

7. A process for chemically modifying a preformed semipermeable polybenzimidazole membrane in accordance with claim 1 wherein said solution of said strong polybasic acid or acid halide is provided at a temperature of about 5° to 100° C. when contacted with said membrane.

8. A process for chemically modifying a preformed semipermeable polybenzimidazole membrane in accordance with claim 1 wherein said contact is conducted for about 5 to 300 minutes.

9. A process for chemically modifying a preformed polybenzimidazole semipermeable membrane in accordance with claim 1 wherein said strong polybasic acid or acid halide is selected from the group consisting essentially of perfluoroglutaric acid, isophthaloyl chloride, polyacrylic acid, sulfuric acid, 1,2,4,5-benzenetetracarboxylic acid, 1,4,5,8-naphthalene tetracarboxylic acid, and mixtures of the foregoing.

10. A process for chemically modifying a preformed polybenzimidazole semipermeable membrane in accordance with claim 1 wherein said relatively mild acid medium is glacial acetic acid.

11. A chemically modified polybenzimidazole semipermeable membrane which is insoluble N,N-dimethylacetamide formed in accordance with the process of claim 1.

12. A process for chemically modifying a preformed poly-2,2'-(m-phenylene-5,5'-bibenzimidazole semipermeable membrane comprising contacting said membrane which is soluble in N,N-dimethylacetamide with a strong polybasic organic acid having a pK$_A$ value below 4 or its acid halide which is dissolved in glacial acetic acid in a concentration of about 1 to 25 percent by weight based upon the total weight of the solution to form a cross-linked poly-2,2'-(m-phenylene)-5,5'-bibenzimidazole which is not soluble in N,N-dimethylacetamide wherein said polybasic organic acid reacts with the imidazole groups of said membrane.

13. A process for chemically modifying a preformed poly-2,2'-(m-phenylene)-5,5'-bibenzimidazole semipermeable membrane in accordance with claim 12 wherein said membrane is a film having a thickness of about 1 to 5 mils.

14. A process for chemically modifying a preformed poly-2,2'-(m-phenylene-5,5'-bibenzimidazole semipermeable membrane in accordance with claim 12 wherein said membrane is a hollow filament having a wall thickness of about 20 to 160 microns.

15. A process for chemically modifying a preformed semipermeable poly-2,2'-(m-phenylene-5,5'-bibenzimidazole membrane in accordance with claim 12 wherein said solution of strong polybasic organic acid or its acid halide is provided at a temperature of about 20° to 30° C. when contacted with said membrane.

16. A process for chemically modifying a preformed semipermeable poly-2,2'-(m-phenylene)-5,5'-bibenzimidazole membrane in accordance with claim 12 wherein said contact is conducted for about 5 to 120 minutes.

17. A process for chemically modifying a preformed semipermeable poly-2,2'-(m-phenylene-5,5'-bibenzimidazole membrane in accordance with claim 12 wherein said polybasic organic acid or acid chloride is selected from the group consisting essentially of perfluoroglutaric acid, isophthaloyl chloride polyacrylic acid, 1,2,4,5-benzenetetracarboxylic acid, 1,4,5,8-naphthalene tetracarboxylic acid, and mixtures of the foregoing.

18. A process for chemically modifying a preformed semipermeable poly-2,2'-(m-phenylene)-5,5'-bibenzimidazole membrane in accordance with claim 12 wherein said polybasic organic acid or acid chloride is perfluoroglutaric acid.

19. A process for chemically modifying a preformed semipermeable poly-2,2'-(m-phenylene)-5,5'-bibenzimidazole membrane in accordance with claim 12 wherein said strong polybasic organic acid having a pK$_A$ value below 4 is present in said glacial acetic acid in a concentration of about 1 to 10 percent by weight based upon the total weight of the solution.

* * * * *

UNITED STATES PATENT OFFICE
CERTIFICATE OF CORRECTION

Patent No. 4,020,142      Dated April 26, 1977

Inventor(s) Howard J. Davis et al.

It is certified that error appears in the above-identified patent and that said Letters Patent are hereby corrected as shown below:

In the title, after "SEMIPERMEABLE" insert -- MEMBRANES --.

Signed and Sealed this twelfth Day of July 1977

[SEAL]

Attest:

RUTH C. MASON
*Attesting Officer*

C. MARSHALL DANN
*Commissioner of Patents and Trademarks*